Nov. 13, 1962  D. J. LARSON  3,063,176
REPLACEABLE RIPPER TIP
Filed Oct. 27, 1960  2 Sheets-Sheet 1

INVENTOR.
Donald J. Larson
BY
*Fryer and Griswold*
ATTORNEYS

Nov. 13, 1962  D. J. LARSON  3,063,176
REPLACEABLE RIPPER TIP
Filed Oct. 27, 1960  2 Sheets-Sheet 2

INVENTOR.
Donald J. Larson
BY
*Fryer and Zimvold*
ATTORNEYS

United States Patent Office 3,063,176
Patented Nov. 13, 1962

3,063,176
REPLACEABLE RIPPER TIP
Donald J. Larson, Joliet, Ill., assignor to Caterpillar Tractor Co., Peoria, Ill., a corporation of California
Filed Oct. 27, 1960, Ser. No. 65,459
3 Claims. (Cl. 37—142)

This invention relates to the hard, replaceable working tips used on the teeth of rippers and other earth working machines.

The invention is described herein in its application to a ripper which is taken as an example of an implement which is subjected to extremely severe service. Its usefulness on other implements which have earth engaging teeth such as power shovels, loader buckets and the like will be apparent from an understanding of the following description.

Many presently known ripper tips are of the so-called fabricated type formed on a hard steel plate which affords a working edge and a softer heavy sheet metal housing member welded to the plate to provide a socket for the reception of a tapered or chisel shaped ripper tooth. These parts are welded together at meeting edges or corners of the socket which are highly stressed during heavy duty service and the welds are subject to frequent failure. Furthermore because of the plate form of the working part of the tip there is a limit to which the working edge may extend forwardly of the housing part to provide a mass of metal to be worn away before replacement of the tip becomes necessary.

It is the object of the present invention to provide a replaceable tip of the kind referred to above which overcomes the disadvantages mentioned and is superior in strength and durability to known tips with a saving in metal over tips employed for comparable service.

Further objects and advantages of the invention are made apparent in the following specification wherein reference is made to the accompanying drawings.

Figure 1:
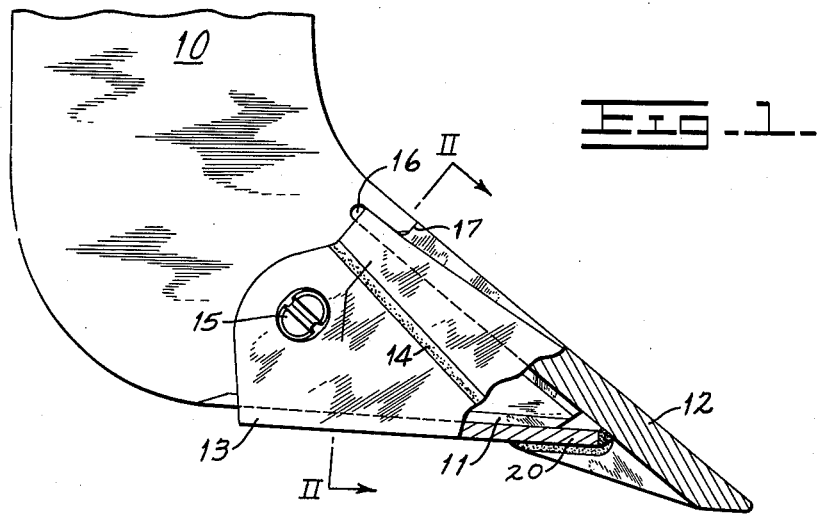
FIG. 1 is a view in side elevation with parts shown in section of the lower end of a ripper shank with a ripper tip constructed in accordance with the present invention in place thereon.
Figure 2:
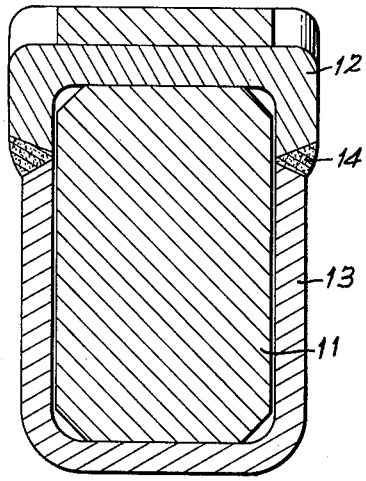
FIG. 2 is an enlarged sectional view taken on the line II—II of FIG. 1.
Figure 3:
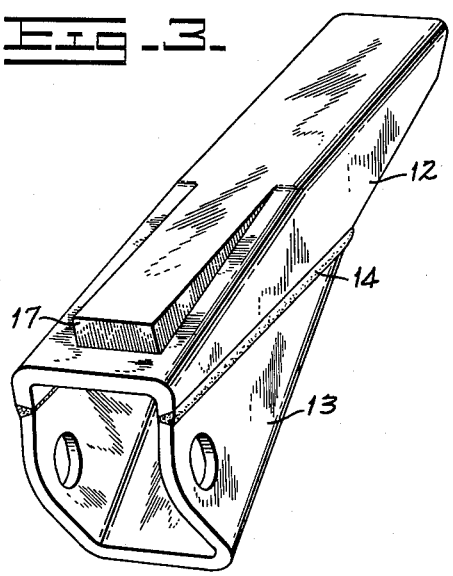
FIG. 3 is a perspective view of the ripper tip shown in FIG. 1 removed from the shank.

The lower end of a ripper shank is shown at 10 in FIG. 1 as having the customary forwardly directed tooth portion 11 over which a hardened tip is fitted. The tip of the present invention comprises a working blade 12 and a housing portion 13 secured thereto as by welding shown at 14. The blade and housing form a receptacle providing a socket which receives the tooth portion of the ripper shank and is secured thereon by a retaining pin 15 which does not form a part of the present invention and may be any conventional type of retaining pin. The ripper shank is provided with a notch shown at 16 in FIG. 1 which receives the rear edge of the working blade and permits abutment between a shoulder 17 on the blade (see FIG. 3) and a portion of the tooth just above notch 16. This is more or less conventional practice, the purpose of which is to absorb thrust on the working blade which might otherwise be absorbed by the retaining pin 15 or cause jamming of the tooth in the tip.

Figure 4:
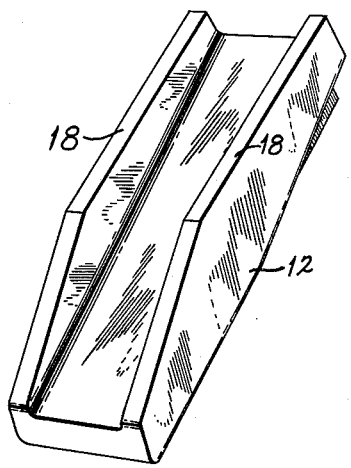
FIG. 4 is an inverted perspective view of the blade portion only of the ripper tip.
Figure 5:
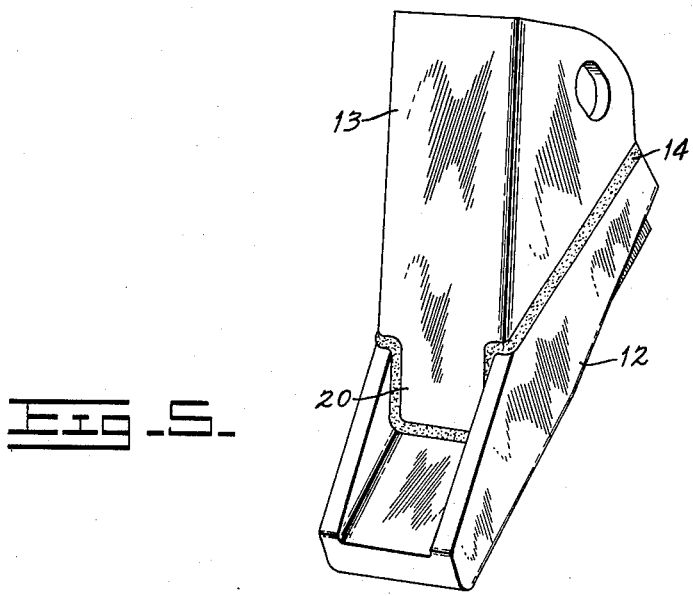
FIG. 5 is an inverted perspective view of the tip shown in FIG. 3.

The blade 12 according to the present invention is a casting or forging provided with a pair of side flanges, most clearly shown at 18 in FIG. 4, giving it a generally U-shaped cross section. These flanges meet the edges of the housing, which is also of U-shaped cross section so that the housing and blade are connected by the welding 14 in a flat area rather than at the inside corners of the socket formed by the blade and housing. In addition, the housing has a tongue-like extension shown at 20 in FIGS. 1 and 5 which projects into the space between the side flanges of the tooth portion permitting continuous welding down the inner sides of said flanges and across the under face of the working blade as best shown in FIG. 5.

Due to the construction hereinabove described, the weld between the working blade and the housing is unusually strong and is not subjected to the cracking stresses which occur at the inside corners of the tip. Furthermore the flanges 18 on the sides of the working blade which give the blade a U-shaped cross section add structural strength thereto and enable the blade to project farther forwardly of the housing than is feasible when a plain flat blade is employed. This has the advantage that there is more working area of the blade projecting forwardly of the position where it meets the housing thereby providing more material to be worn away in service before the tip is discarded.

Due to the superior strength gained by the described location of the weld between the working blade and the housing, it has been possible to reduce the size of the socket which receives the tooth portion of the ripper shank and the overall size of the tip has been made smaller than existing tips of comparable capacity even though more metal is disposed forwardly in the working area of the blade.

I claim:

1. A replaceable tip for the tooth of a ripper or the like which comprises a hardened working blade having flanges to provide a U-shaped cross section, a housing part of similar cross section, and a weld securing the blade and housing part together to form a tapered socket adapted to fit over the tooth, said housing part having a portion projecting into the space between the flanges of the blade and welded to the flanges.

2. A replaceable tip for the tooth of a ripper or the like which comprises a hardened working blade having flanges to provide a U-shaped cross section, a housing part of similar cross section, and a weld securing the blade and housing part together to form a tapered socket adapted to fit over the tooth, said housing part having a portion projecting into the space between the flanges of the blade and welded to the flanges and to the blade between the flanges and said blade having a flanged portion extending forwardly of the housing part.

3. A replaceable tip for the tooth of a ripper or the like which comprises a hardened working blade having flanges to provide a U-shaped cross seciton, a housing part of similar cross section, and a weld securing the blade and housing part together to form a tapered socket adapted to fit over the tooth, said housing part having a portion projecting into the space between the flanges of the blade and welded to the flanges and the blade, and said blade having a flanged portion extending forwardly of the housing part with the flanges thereof tapering toward the forward end of the blade.

References Cited in the file of this patent
UNITED STATES PATENTS

| | | |
|---|---|---|
| 2,027,898 | Broulhiet | Jan. 14, 1936 |
| 2,227,674 | Ratkowski | Jan. 7, 1941 |
| 2,716,822 | Launder et al. | Sept. 6, 1955 |
| 2,952,929 | Lindberg | Sept. 20, 1960 |